(12) United States Patent
Ikami

(10) Patent No.: US 11,530,989 B2
(45) Date of Patent: Dec. 20, 2022

(54) FLUORESCENCE IMAGING DEVICE

(71) Applicant: FUJIFILM Corporation, Tokyo (JP)

(72) Inventor: Seishi Ikami, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 393 days.

(21) Appl. No.: 16/936,439

(22) Filed: Jul. 23, 2020

(65) Prior Publication Data

US 2021/0025825 A1 Jan. 28, 2021

(30) Foreign Application Priority Data

Jul. 26, 2019 (JP) .............................. JP2019-138234

(51) Int. Cl.
*G02B 3/08* (2006.01)
*G01N 21/64* (2006.01)

(52) U.S. Cl.
CPC ..... *G01N 21/6452* (2013.01); *G01N 21/6456* (2013.01); *G02B 3/08* (2013.01)

(58) Field of Classification Search
CPC ... G01N 21/6452; G01N 21/6456; G02B 3/08
USPC ......................................... 359/742, 798–800
See application file for complete search history.

(56) References Cited

U.S. PATENT DOCUMENTS

| | | | |
|---|---|---|---|
| 6,246,525 B1 | 6/2001 | Ikami | |
| 7,369,227 B2 | 5/2008 | Gutekunst et al. | |
| 7,628,958 B2 | 12/2009 | Tamaoki et al. | |
| 8,379,201 B2 | 2/2013 | Bielawski | |
| 2006/0194308 A1 | 8/2006 | Gutekunst et al. | |
| 2009/0155891 A1 | 6/2009 | Tamaoki et al. | |
| 2015/0091233 A1 | 4/2015 | Souza et al. | |

FOREIGN PATENT DOCUMENTS

| | | |
|---|---|---|
| JP | H06273602 | 9/1994 |
| JP | 2000074837 | 3/2000 |
| JP | 2002323859 | 11/2002 |
| JP | 2006215025 | 8/2006 |
| JP | 2007046904 | 2/2007 |
| JP | 2008275408 | 11/2008 |
| JP | 2008541071 | 11/2008 |
| JP | 4605713 | 1/2011 |
| JP | 4854334 | 1/2012 |
| JP | 6305985 | 4/2018 |

OTHER PUBLICATIONS

"Office Action of Japan Counterpart Application", dated May 10, 2022, with English translation thereof, p. 1-p. 6.

*Primary Examiner* — William Choi
(74) *Attorney, Agent, or Firm* — JCIPRNET

(57) ABSTRACT

A fluorescence imaging device includes a microplate that holds a plurality of samples generating fluorescence, a lens assembly, and an imaging unit that collectively images the plurality of samples through the lens assembly. The lens assembly includes a Fresnel lens made of a resin, a second protective plate that protects the surface of the Fresnel lens facing the microplate, a spacer that forms a gap between the Fresnel lens and the protective plate, and a frame by which the Fresnel lens, the second protective plate, and the spacer are sandwiched.

20 Claims, 7 Drawing Sheets

FLUORESCENCE IMAGING DEVICE

CROSS-REFERENCE TO RELATED APPLICATIONS

This application claims priority under 35 U.S.C. § 119(a) to Japanese Patent Application No. 2019-138234 filed on 26 Jul. 2019. The above application is hereby expressly incorporated by reference, in its entirety, into the present application.

BACKGROUND OF THE INVENTION

1. Field of the Invention

The present invention relates to a fluorescence imaging device that images a sample using fluorescence generated by the sample.

2. Description of the Related Art

In the related art, a sample is imaged using fluorescence generated by the sample in the fields of biochemistry, molecular biology, and the like so that inspection and research are performed in addition to the examination of the sample. In the examination and the like, the amount of fluorescence generated by the sample, a change in the amount of fluorescence, or the like is measured using the image that is taken from the sample using, for example, the fluorescence. Further, the objects of the examination and the like are to obtain qualitative and quantitative information about samples that are an object for the examination and the like.

The examination and the like are generally performed for a plurality of samples of which the characteristics, conditions, or the like are different from each other. For this purpose, a microplate (also referred to as a multi-well plate, a microtiter plate, or the like) for holding a plurality of samples is used. The microplate detects the light emission or fluorescence of the sample for each well using a dedicated reading device and checks the amount thereof. However, time is required to serially perform processing for each well in this reading device. Accordingly, there is known a device that detects an image by imaging the entire microplate substantially simultaneously and quantitates the light emission or fluorescence of the sample from the image.

On the other hand, in a case where a microplate is used, parallax depending on a position on the microplate is generated, which may affect the results of an examination and the like. For this reason, there is known a fluorescence imaging device that reduces parallax and simultaneously images a plurality of samples by using a telecentric optical system using a Fresnel lens (JP4854334B (corresponding to US2009/155891A1), JP4605713B (corresponding to US2006/194308A1), and JP6305985B (corresponding to US2015/091233A1)).

SUMMARY OF THE INVENTION

In a case where a plurality of samples are to be simultaneously imaged using a microplate as described above, the influence of parallax on an examination and the like can be reduced by the use of a Fresnel lens. Further, the Fresnel lens is generally made of a resin. The reason for is that the Fresnel lens made of a resin is more easily produced than a Fresnel lens made of glass and can be more inexpensive than the Fresnel lens made of glass.

Meanwhile, a chemical, such as acetic acid, is used for a sample according to the contents of an examination and the like, but the resistance of a Fresnel lens, which is made of a resin, to the chemical used for the sample is lower than that of a Fresnel lens, which is made of glass, to the chemical. For this reason, deterioration, such as discoloration, may occur in a case where the Fresnel lens made of a resin is used without being protected. Further, while the Fresnel lens made of a resin is used for repeated examinations, deterioration may occur. For this reason, in a case where the Fresnel lens made of a resin is used, it is desired to protect the Fresnel lens, which is made of a resin, from the sample (particularly, a chemical used for the sample).

Further, it is conceivable to use a protective plate, which is separate from the Fresnel lens made of a resin, in a case where the Fresnel lens made of a resin is protected. However, in a case where the Fresnel lens and the protective plate to be inserted into or removed from an imaging device as necessary are formed separately from each other, time and effort required for arranging the Fresnel lens and the protective plate are taken. For this reason, in a case where the Fresnel lens made of a resin is protected using the protective plate, it is preferable that the Fresnel lens and the protective plate are substantially integrated with each other.

However, in a case where a lens assembly where the Fresnel lens made of a resin and the protective plate are close to each other and integrated with each other is formed, unexpected moire fringes may be generated due to environmental conditions during use, such as a temperature and/or humidity. The moire fringes cause errors in the results of an examination and the like.

Accordingly, an object of the invention is to provide a fluorescence imaging device that uses a Fresnel lens made of a resin and can perform an accurate examination or the like.

A fluorescence imaging device according to an aspect of the invention comprises: a microplate that holds a plurality of samples generating fluorescence; a lens assembly that is disposed above the microplate, and includes a Fresnel lens of which at least a side facing the microplate is telecentric and which is made of a resin, a protective plate that protects a surface of the Fresnel lens facing the microplate, a spacer that forms a gap between the Fresnel lens and the protective plate, and a frame by which the Fresnel lens and the protective plate are sandwiched through the spacer; and an imaging unit that collectively images the plurality of samples through the lens assembly using the fluorescence generated by the respective samples.

It is preferable that one surface of the Fresnel lens is a flat surface and the spacer forms the gap between the flat surface of the Fresnel lens and the protective plate.

It is preferable that the spacer is thinner than the Fresnel lens and the protective plate.

It is preferable that the spacer is in contact with the Fresnel lens and the protective plate at outer peripheral portions of the Fresnel lens and the protective plate.

It is preferable that the spacer comprises a notch connecting the gap, which is formed between the Fresnel lens and the protective plate, to an outside.

It is preferable that the frame holds the Fresnel lens and the protective plate while allowing the Fresnel lens and the protective plate to be movable in a plane direction.

It is preferable that the frame comprises a cushioning material provided at a portion thereof where the Fresnel lens, the spacer, and the protective plate overlap with each other.

It is preferable that the fluorescence imaging device further comprises an excitation light source disposed between the lens assembly and the microplate and irradiating the samples with excitation light causing the fluorescence to be generated.

It is preferable that the excitation light source has a linear shape or a point shape and irradiates the plurality of samples with the excitation light by scanning a range between the lens assembly and the microplate.

It is preferable that the excitation light source comprises a light blocking member on a surface thereof facing the lens assembly.

The fluorescence imaging device according to the aspect of the invention uses the Fresnel lens made of a resin and can perform an accurate examination or the like.

DESCRIPTION OF THE PREFERRED EMBODIMENTS

Figure 1:
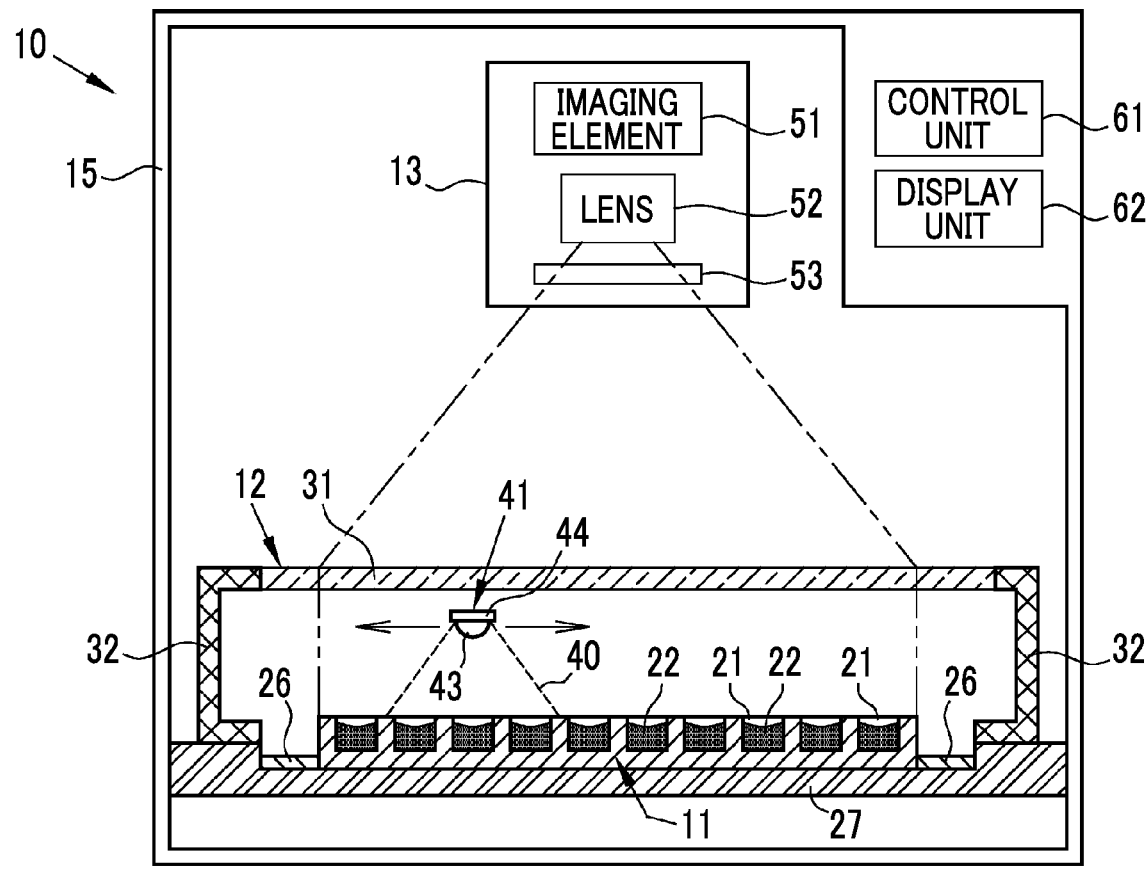
FIG. 1 is a schematic diagram showing a fluorescence imaging device.

As shown in FIG. 1, a fluorescence imaging device 10 comprises a microplate 11, a lens assembly 12, and an imaging unit 13 that are provided in a housing 15.

The microplate 11 has the shape of a substantially flat plate, and includes a plurality of wells 21 (holes or depressions. Hereinafter referred to as wells) that are two-dimensionally arranged on one surface thereof. The arrangement of the wells 21 has the shape of, for example, a square lattice. Each well 21 functions similarly to a petri dish or a test tube, and a sample 22 including a biologically relevant material, such as a protein or a cell, is put in each well. A specific sample 22 to be put in each well 21 is random, but is a material that generates fluorescence by being irradiated with excitation light in this embodiment. Accordingly, the microplate 11 holds a plurality of samples 22 that generate fluorescence.

The samples 22 held in the respective wells 21 by the microplate 11 may vary in terms of properties, conditions, characteristics, or the like for every well 21. Further, each sample 22 includes a chemical solution that allows a protein or the like, which is an object for an examination or the like, to be stably maintained in a predetermined condition required to perform an examination or the like. The chemical solution included in the sample 22 is, for example, a buffer solution, a mounting agent or an imaging agent, a fluorescent reagent, and/or the like. The chemical solution forming the sample 22 may include, for example, acetic acid and the like damaging a methacrylate resin.

The microplate 11 is disposed on a sample tray 27 through a sample guide 26. The sample guide 26 is an auxiliary member that is used to match the shape of the microplate 11 with the inner shape of the sample tray 27 and to dispose the microplate 11 at a predetermined position (for example, the center) on the sample tray 27. For this purpose, the sample guide 26 includes an outer shape matching the shape of the sample tray 27 and a recessed portion or a hole portion to which the microplate 11 is to be fitted.

The sample tray 27 is a general-purpose tray, and a microplate having a shape, a size, or the like different from that of the microplate 11, other petri dishes, or the like in addition to the microplate 11 used in this embodiment can be placed on the sample tray 27. Further, gel, a membrane, and the like can be placed on the sample tray 27. In a case where the samples 22 are to be placed on the sample tray 27 using the microplate 11 or the like, the sample tray 27 allows the microplate 11 or the like to be positioned at a predetermined position using the sample guide 26 that matches the microplate 11 or the like to be used. Furthermore, the sample tray 27 can be freely inserted into and removed from the housing 15, and can be used in exchange for the same type of a sample tray 27.

The lens assembly 12 is disposed above the microplate 11 in the housing 15. The lens assembly 12 is an auxiliary optical system for the imaging unit 13, and the side (object side) of the lens assembly 12 facing the microplate 11 is telecentric. Further, the position of the lens assembly 12 is regulated by the fitting or the like of the lens assembly 12 to the shape or structure of the housing 15, the microplate 11, or the like. On the other hand, the set position of the sample tray 27 is determined in the housing 15. For this reason, in a case where the samples 22 are viewed down from the imaging unit 13, an optical center passes through a lens 52 of the imaging unit 13 and a Fresnel lens 92 (see FIG. 3) of the lens assembly 12. As a result, in a case where the imaging unit 13 images the microplate 11 through the lens assembly 12, the plurality of samples 22 held by the microplate 11 can be imaged without parallax. "Disposed above the microplate 11" means that a component is disposed between the microplate 11 and the imaging unit 13. In this embodiment, the lens assembly 12 is placed on the sample tray 27 holding the microplate 11.

The lens assembly 12 includes a lens portion 31 that functions as an object-side telecentric lens as described above, and leg portions 32 that keep the lens portion 31 with a fixed distance between the lens portion 31 and the microplate 11 while allowing the lens portion 31 to be parallel to the microplate 11. Further, the lens assembly 12 can be freely inserted and removed. For this reason, the lens assembly 12 is inserted above or removed from above the microplate 11 as necessary, and the microplate 11 and the plurality of samples 22 held by the microplate 11 can be imaged.

The imaging unit 13 starts the lens assembly 12 and collectively images the plurality of samples 22 held by the microplate 11. The imaging unit 13 can image the samples 22 that are directly or indirectly illuminated. Further, the imaging unit 13 can image these samples 22 using fluorescence, phosphorescence, or the like generated by the respective samples 22. The fluorescence and the like generated by the samples 22 includes fluorescence and the like generated by the action of a fluorescent marker and the like in addition to the fluorescence (so-called autofluorescence) emitted by a protein or the like that is an object for an examination or the like.

In this embodiment, the imaging unit 13 collectively images the plurality of samples 22 using the fluorescence generated by the respective samples 22 that are held by the microplate 11. For this purpose, the fluorescence imaging device 10 comprises an excitation light source 41 that irradiates one or a plurality of samples 22 with excitation light 40 at a time. The sample 22 is irradiated with the excitation light 40, so that the sample 22 emits fluorescence. The excitation light source 41 is, for example, a linear or point light source, and is disposed between the lens assembly 12 and the microplate 11. Further, the excitation light source 41 is, for example, one or a plurality of light emitting diodes (LEDs), laser diodes (LDs), or lamps, a combination thereof, or the like. Furthermore, the excitation light source 41 irradiates the plurality of samples 22 with the excitation light 40 by scanning a range between the lens assembly 12 and the microplate 11. For this reason, the excitation light source 41 directly irradiates the plurality of samples 22, which are held by the microplate 11, with the excitation light 40 without the lens assembly 12 interposed between the excitation light source 41 and the samples 22. Further, the excitation light source 41 comprises a light blocking member 44, which is provided on the surface thereof facing the lens assembly 12, in addition to a light emitting element 43 that generates the excitation light 40. For this reason, the excitation light 40 is not incident on the lens assembly 12. Since the lens assembly 12 emits autofluorescence in a case where the excitation light 40 is incident on the lens assembly 12, the quantitativeness of an examination or the like may be impaired. However, since the excitation light source 41 comprises the light blocking member 44 as described above so that the excitation light 40 is not incident on the lens assembly 12, an examination or the like can be accurately performed without the generation of the autofluorescence of the lens assembly 12.

The imaging unit 13 comprises an imaging element 51, a lens 52, and an optical filter 53. The lens 52 forms the image of the microplate 11 and/or the plurality of samples 22 held by the microplate 11 on the imaging element 51, and the imaging element 51 outputs this image as an image. The optical filter 53 is, for example, a bandpass filter, and blocks the excitation light 40 and transmits the fluorescence generated by the samples 22. Since the optical filter 53 is present, the imaging unit 13 can image the samples 22 substantially using only the fluorescence generated by the samples 22. Since the imaging unit 13 includes a plurality of types of optical filters 53, and the optical filters 53 can be appropriately replaced according to the wavelength or the like of the excitation light 40 and/or the fluorescence generated by the samples 22.

The housing 15 forms a darkroom in the case of at least the imaging of the samples 22. For this reason, the imaging unit 13 can image the samples 22 held by the microplate 11 in a state where external light is blocked by the housing 15. Further, the housing 15 also functions as a constant-temperature tank or the like. That is, the housing 15 can adjust a predetermined environmental condition suitable for an examination or the like in the case of imaging and before and after the imaging, and can maintain this environmental condition.

In addition, the fluorescence imaging device 10 comprises a control unit 61 and a display unit 62. The control unit 61 controls the operation of each component of the fluorescence imaging device 10. Specifically, the control unit 61 adjusts the timing and exposure time of the imaging to be performed by the imaging unit 13 (particularly, the imaging element 51), adjusts the scanning performed by the excitation light source 41, changes the wavelength of the excitation light 40, adjusts the amount of the excitation light 40, and adjusts the temperature, humidity, and/or the like of an environment in the housing 15. The display unit 62 exposes the screen thereof to the outer surface of the housing 15, and displays the progress, results, and the like of an examination. Further, the display unit 62 is formed of, for example, a touch panel, and also functions as an operation unit that is used to instruct the fluorescence imaging device 10 to operate. In a case where the display unit 62 does not double as an operation unit, an operation unit (not shown) is provided separately from the display unit 62.

Figure 2:
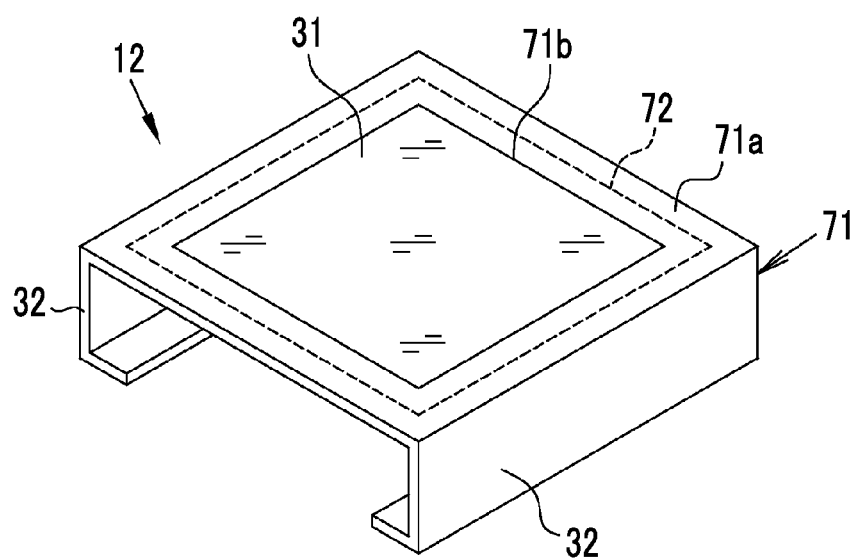
FIG. 2 is a perspective view of a lens assembly.

As shown in FIG. 2, the lens assembly 12 comprises a frame 71 and a lens unit 72. The frame 71 includes an upper surface portion 71a that has the shape of a flat quadrangular plate, and leg portions 32 which are connected to two opposite sides of the upper surface portion 71a at an angle of about 90°, respectively and of which portions being in contact with the sample tray 27 are folded back. The lens unit 72 is built in the upper surface portion 71a of the frame 71. Further, the frame 71 exposes the lens unit 72 to the outside through a window 71b that is provided substantially at the center of the upper surface portion 71a. The exposed portion of the lens unit 72 is the lens portion 31 that functions as an object-side telecentric lens in imaging.

Figure 3:
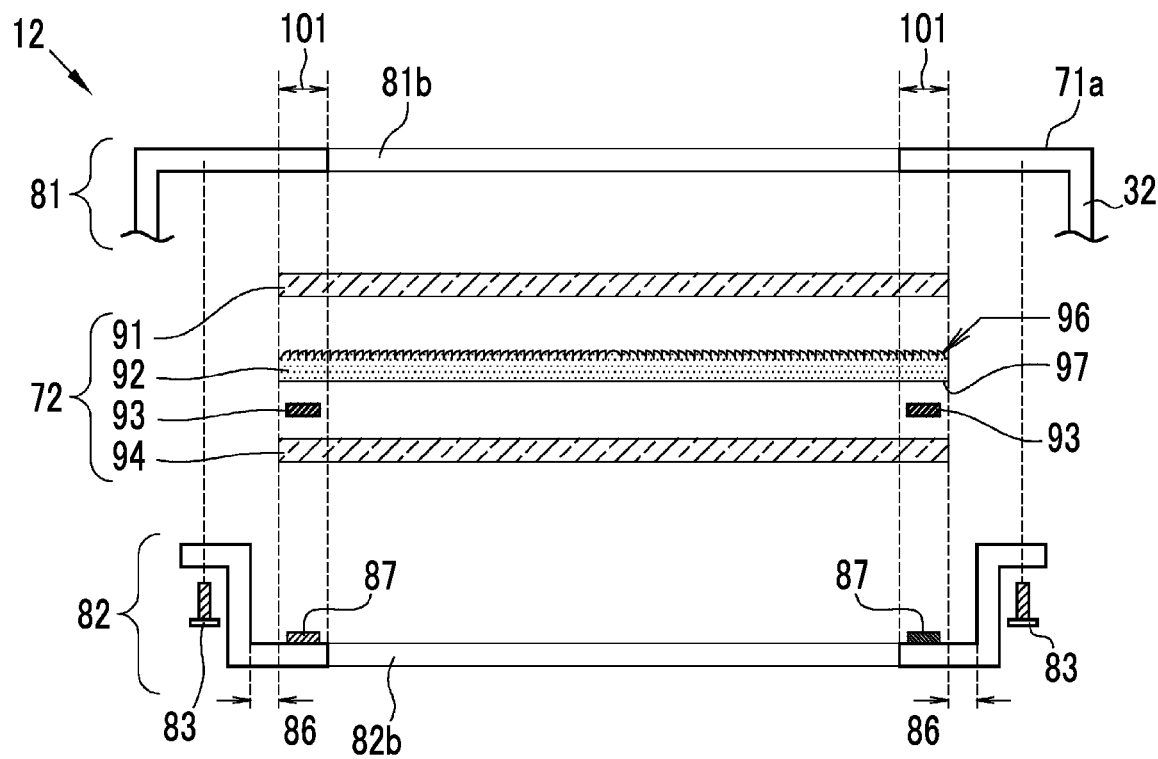
FIG. 3 is an exploded view of the lens assembly.

In more detail, the upper surface portion 71a of the lens assembly 12 comprises a first frame 81, the lens unit 72, and a second frame 82 as shown in FIG. 3.

The first and second frames 81 and 82 form the frame 71 of the lens assembly 12. The first frame 81 is a member that forms a portion of the frame 71 facing the imaging unit 13 in an arrangement state (see FIG. 1) in the case of imaging. In this embodiment, end portions of the first frame 81 are folded back to form the leg portions 32. The second frame 82 is a member that forms a portion of the frame 71 facing the microplate 11 in the arrangement state in the case of imaging. In this embodiment, the second frame 82 is fixed to the first frame 81 by, for example, screws 83. Accordingly, the lens unit 72 is sandwiched between the first and second frames 81 and 82, that is, the frame 71.

Further, the first and second frames 81 and 82 include an opening 81b and an opening 82b at corresponding positions, respectively. The openings 81b and 82b are form the window 71b through which the lens unit 72 is exposed to the outside.

In addition, a gap 86 is formed between each of the first and second frames 81 and 82 and the lens unit 72 in a plane direction. Accordingly, the frame 71 holds the entire or a part of the lens unit 72, which includes a Fresnel lens 92 and a second protective plate 94, while allowing the lens unit 72 to be movable in the plane direction. The entire or a part of the lens unit 72 may expand due to the temperature, humidity, and/or the like of an environment where the lens assembly 12 is to be used or stored, so that deformation, such as warpage, or damage and the like caused by the deformation may occur. Accordingly, in a case where the gaps 86 are formed between the frame 71 and the lens unit 72 as described above so that a part or all of the lens unit 72 is movable in the plane direction, deformation, damage, and the like caused by an environment where the lens assembly 12 is to be used or stored can be prevented.

Further, the frame 71 comprises a cushioning material 87 provided at a portion thereof where the lens unit 72 includes a spacer 93, that is, a portion thereof where the Fresnel lens 92, the spacer 93, the second protective plate 94, and the like overlap with each other. The reason for this is to allow the lens unit 72 to be pressed with an appropriate force so that the respective components of the lens unit 72 are integrally held while being sandwiched between the first and second frames 81 and 82 in a case where the first and second frames 81 and 82 are connected to each other.

The lens unit 72 comprises a first protective plate 91, the Fresnel lens 92, the spacer 93, and the second protective plate 94. An order where these are arranged is an order where the first protective plate 91, the Fresnel lens 92, the spacer 93, and the second protective plate 94 are arranged from the imaging unit 13 in the arrangement state in the case of imaging. Further, all of the first protective plate 91, the Fresnel lens 92, the spacer 93, and the second protective plate 94 are integrally held by a force applied from the first and second frames 81 and 82 without being bonded or adhered to each other. The reason for this is to prevent the deformation, such as warpage, and a defect, such as a partial change in optical characteristics caused by deformation or the like, from occurring due to the temperature, humidity, and/or the like of an environment where the lens assembly 12 is to be used or stored since the coefficients of expansion of these respective components are different from each other.

In the arrangement state in the case of imaging, the first protective plate 91 protects the surface of the Fresnel lens 92 facing the imaging unit 13 from deterioration caused by components, such as acetic acid, (hereinafter referred to as acetic acid and the like) which damage a resin product, of the chemical solution of the sample 22. Further, in the arrangement state in the case of imaging, the second protective plate 94 protects the surface of the Fresnel lens 92 facing the microplate 11 from the deterioration caused by the acetic acid and the like of the sample 22. For this purpose, each of the first and second protective plates 91 and 94 is made of a material having resistance to the acetic acid and the like of the sample 22 higher than that of the Fresnel lens 92, for example, glass. In this embodiment, each of the first and second protective plates 91 and 94 is a so-called glass sheet that can allow deformation, such as "bending", in a broad point of view while keeping a certain stiffness.

The Fresnel lens 92 is a lens of which at least the side (object side) facing the microplate 11 in the arrangement state in the case of imaging is telecentric. Further, the Fresnel lens 92 is a lens that is formed in a substantially flat shape as a whole by dividing an object-side telecentric lens into concentric regions and forming the object-side telecentric lens on at least one surface of the lens. In this embodiment, the surface of the Fresnel lens 92 facing the imaging unit 13 is a lens surface 96 having the shape of the above-mentioned lens and the other surface of the Fresnel lens 92 facing the microplate 11 is a flat surface 97. Furthermore, the Fresnel lens 92 is made of a resin, such as a methacrylate resin, an acrylic resin, a polystyrene resin, or a polycarbonate resin. The reason for this is for manufacturing cost and easiness. However, since the Fresnel lens 92 is made of a resin, the deterioration of the Fresnel lens 92, such as the discoloration of the Fresnel lens 92, may be caused by the acetic acid and the like of the sample 22 in a case where the Fresnel lens 92 is used without being protected. For this reason, the Fresnel lens 92 is protected in the lens assembly 12 by the first and second protective plates 91 and 94.

Figure 4:
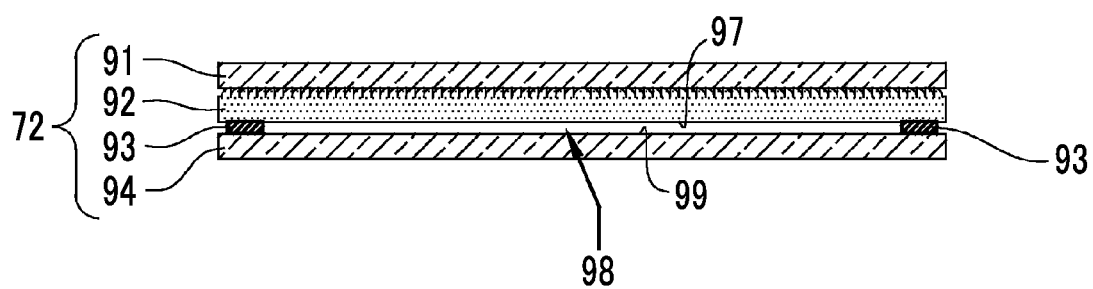
FIG. 4 is a diagram illustrating a Fresnel lens unit.

The spacer 93 is a member that forms a gap between the Fresnel lens 92 and the protective plate for protecting the surface of the Fresnel lens 92 from the acetic acid and the like of the sample 22. In this embodiment, the spacer 93 forms a gap 98 between the Fresnel lens 92 and the second protective plate 94 in a case where the lens unit 72 is sandwiched by the frame 71 and the Fresnel lens 92 and the second protective plate 94 are integrally held as shown in FIG. 4. The surface of the Fresnel lens 92 facing the microplate 11 is the flat surface 97. For this reason, the spacer 93 forms the gap 98 between the flat surface 97 and the second protective plate 94. As a result, the spacer 93 prevents the entire and partial close contact between the Fresnel lens 92 and a flat surface 99 of the second protective plate 94 facing the Fresnel lens 92 which is caused by the temperature, humidity, and/or the like of an environment where the lens assembly 12 is to be used or stored. Further, the spacer 93 can prevent the entire and partial close contact between the Fresnel lens 92 and the surface 99 of the second protective plate 94 which is caused by a change in atmospheric pressure in a case where the lens assembly 12 is transported by an airplane or the like.

For example, the spacer 93 is thinner than the Fresnel lens 92 and the second protective plate 94. In a case where the gap 98 is large since the spacer 93 is thicker than the Fresnel lens 92 and the second protective plate 94, the flexibility of the entire lens unit 72, which is obtained since lens unit 72 is substantially integrated, is reduced. As a result, the second protective plate 94 is likely to be damaged due to contact with the second protective plate 94 that is exposed to the outside through the opening 82b.

Further, at least a part of the spacer 93 is in contact with the Fresnel lens 92 and the second protective plate 94 at outer peripheral portions 101 of the Fresnel lens 92 and the second protective plate 94 (see FIG. 3). The outer peripheral portion 101 means a portion of the lens unit 72 that is hidden by the frame 71, that is, a portion that is not exposed to the window 71b formed by the openings 81b and 82b. The reason why the spacer 93 is provided at the outer peripheral portion 101 as described above is to prevent the spacer 93 from coming off and to allow the frame 71 to reliably and integrally hold the lens unit 72 through the spacer 93.

Figure 5:
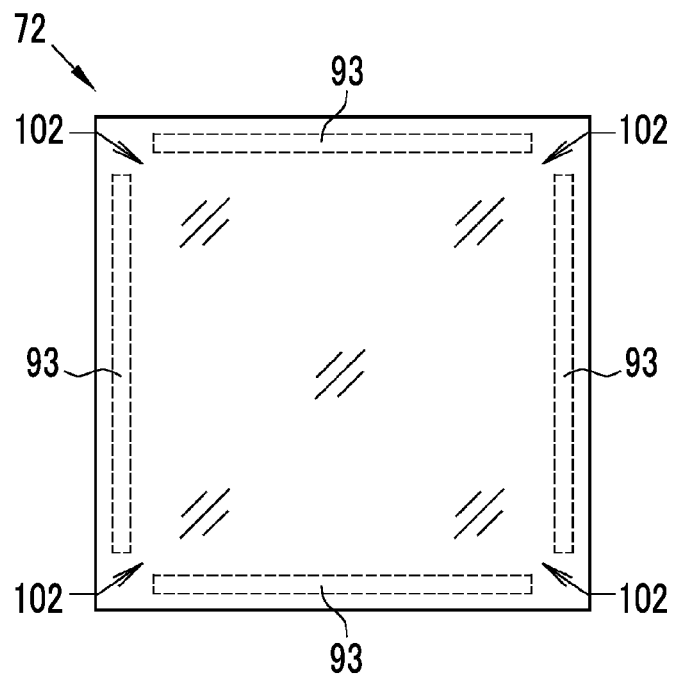
FIG. 5 is a diagram illustrating the arrangement of a spacer in the Fresnel lens unit.

Furthermore, the spacer 93 comprises one or a plurality of notches 102 as shown in FIG. 5. The notches 102 connect the gap 98, which is formed between the Fresnel lens 92 and the second protective plate 94, to the outside. Since the notches 102 are present, air present in the gap 98 can be replaced with outside air. For this reason, environments, such as a temperature, humidity, and atmospheric pressure in the gap 98, coincide with the temperature, humidity, atmospheric pressure, and the like of an environment where the lens assembly 12 is to be used or stored. As a result, it is possible to prevent the deformation of the lens unit 72 (particularly, the second protective plate 94) that is caused by a difference in temperature or the like between the gap 98 and the outside or damage and the like that are caused by the deformation.

Figure 6:
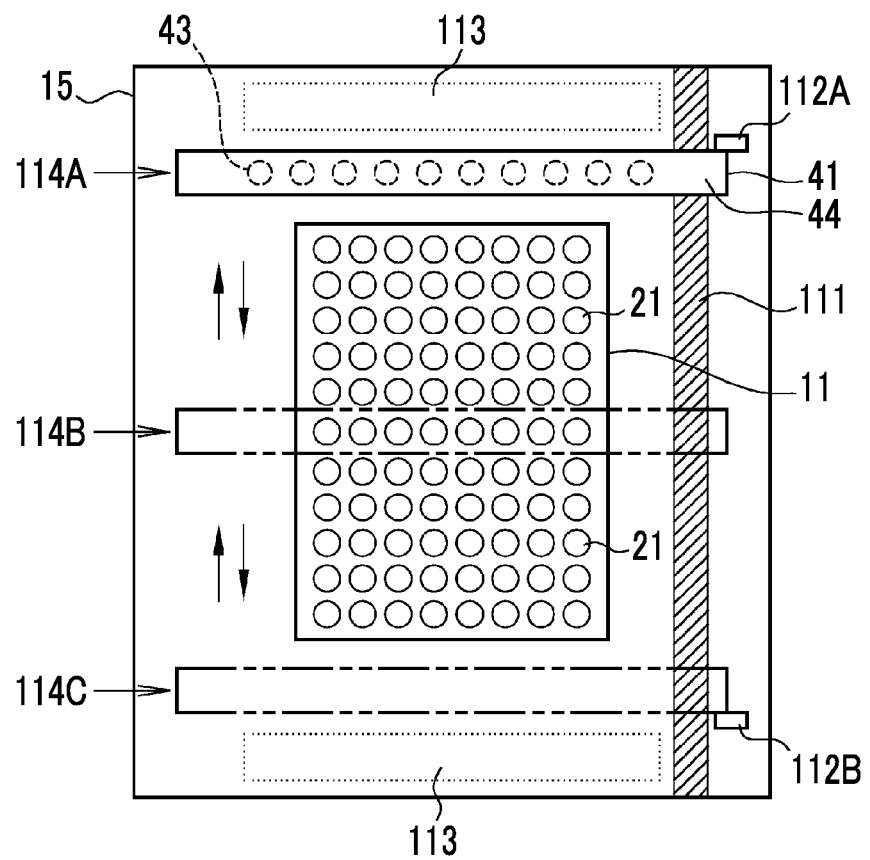
FIG. 6 is a diagram illustrating configuration and a scanning aspect corresponding to scanning using an excitation light source.

In addition, the fluorescence imaging device 10 comprises a shaft 111, a microswitch 112A, and a microswitch 112B to scan an object using the excitation light source 41 as shown in FIG. 6 in a case where the samples 22 are imaged. The excitation light source 41 is mounted on the shaft 111, and the shaft 111 allows the excitation light source 41 to move in stages or continuously in the longitudinal direction thereof in the case of imaging. The control unit 61 disposes the excitation light source 41 at an initial position in a case where the microplate 11 is disposed. The initial position is a first position 114A or a second position 114C that does not overlap with the microplate 11 in a case where the lens assembly 12 is viewed from the imaging unit 13 and is closer to the microplate 11 than a contact position 113 at which the leg portions 32 of the lens assembly 12 are in contact with the sample tray 27.

Further, the control unit 61 turns on the excitation light source 41 to emit the excitation light 40 in the case of imaging. Then, the control unit 61 scans an object using the excitation light source 41, which is emitting the excitation light 40, at a predetermined speed from the first position 114A or the second position 114C, which is the initial position, to the other initial position (the second position 114C or the first position 114A). The predetermined speed is a speed that allows each sample 22 to be irradiated with the excitation light 40 of which the amount is required for the imaging of each sample 22, and is a constant speed of, for example, 2 cm/sec. Accordingly, the excitation light source 41 irradiates the microplate 11 and the sample 22 held by the microplate 11 with the excitation light 40 while passing above the microplate 11 and the sample 22 as shown at, for example, a scanning position 114B. On the other hand, the control unit 61 starts imaging to be performed by the imaging unit 13 together with the start of the scanning using the excitation light source 41, and adjusts the exposure time of the imaging element 51 to a time (for example, about 10 sec.) longer than a time that is required until the excitation light source 41 reaches from one initial position to the other initial position. Accordingly, the fluorescence imaging device 10 obtains an image that is taken from the samples 22 using the fluorescence generated by the samples 22.

The microswitch 112A is turned on in a case where the excitation light source 41 reaches the first position 114A, and inputs a signal, which shows that the excitation light source 41 reaches the first position 114A, to the control unit 61. Likewise, the microswitch 112B is turned on in a case where the excitation light source 41 reaches the second position 114C, and inputs a signal, which shows that the excitation light source 41 reaches the second position 114C, to the control unit 61. Then, in a case where it is detected that the excitation light source 41 reaches the first or second position 114A or 114C from the input of the signal from the microswitch 112A or 112B, the control unit 61 stops moving the excitation light source 41, ends the imaging performed by the imaging unit 13, and acquires an image that is collectively taken from the plurality of samples 22.

As described above, the fluorescence imaging device 10 uses the microplate 11 that holds the plurality of samples 22 generating fluorescence and the lens assembly 12, and the imaging unit 13 collectively images the plurality of samples 22 through the lens assembly 12 using the fluorescence generated by the respective samples 22. Further, the lens assembly 12 uses the Fresnel lens 92 made of a resin, but the Fresnel lens 92 made of a resin is covered with the first and second protective plates 91 and 94, so that the deterioration of the Fresnel lens 92 caused by the acetic acid and the like from the sample 22 is prevented.

Further, since the lens assembly 12 integrally holds the Fresnel lens 92 made of a resin and the first and second protective plates 91 and 94, the Fresnel lens 92, the first protective plate 91, and the second protective plate 94 do not need to be arranged respectively in a case where the lens assembly 12 is used. For this reason, the imaging procedure of the fluorescence imaging device 10 using the lens assembly 12 is simple in comparison with a case where the Fresnel lens 92, the first protective plate 91, and the second protective plate 94 are arranged in the housing 15, respectively.

Figure 7:
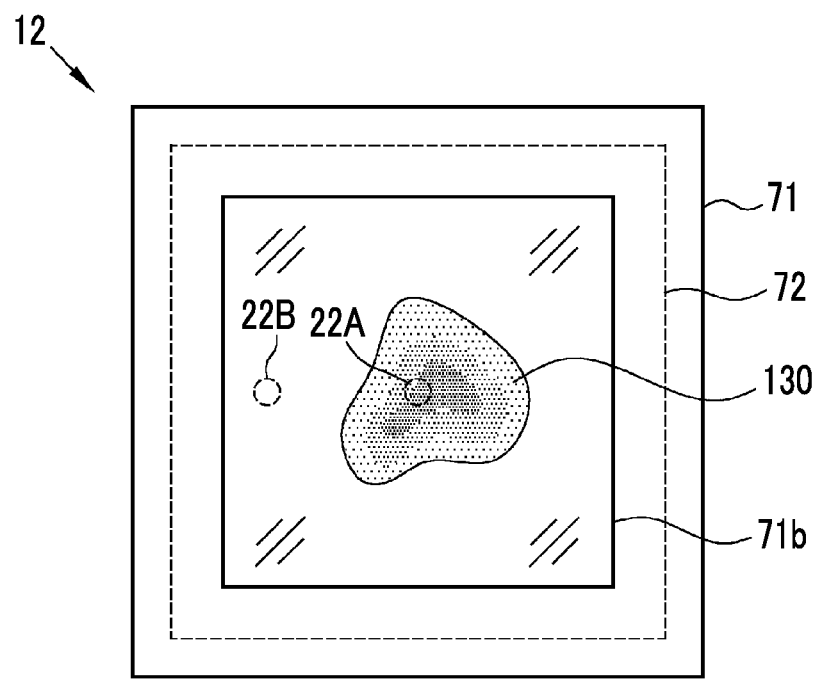
FIG. 7 is a diagram illustrating moire fringes that are generated on the lens assembly not including a spacer.

Furthermore, the lens assembly 12 includes the spacer 93 between the flat surface 97 of the Fresnel lens 92 and the flat surface 99 of the second protective plate 94 facing the flat surface 97, and the gap 98 is formed between these surfaces. In the case of a comparative example not including the spacer 93, moire fringes 130 may be generated as shown in FIG. 7. For example, water vapor contained in the air present in the gap 98 is condensed due to the temperature or humidity of an environment where the lens assembly 12 is to be used or stored or a change in the temperature or humidity and the flat surface 97 of the Fresnel lens 92 and the flat surface 99 of the second protective plate 94 partially adhere to each other, so that the moire fringes 130 are generated. For example, a difference in color, density, brightness, or the like caused by whether or the moire fringes 130 overlap with each other occurs between the taken images of a sample 22A where the moire fringes 130 overlap with each other and a sample 22B where the moire fringes 130 do not overlap with each other. As a result, accurate measurement, comparison, and the like of these samples 22A and 22B may be hindered. Further, the moire fringes 130 are not caused by damage to components of the lens assembly 12 as described above, and can be removed by the adjustment of an environment for use or the like. However, since the appearance of the lens assembly 12 is spoiled in a case where the moire fringes 130 are generated, a user suspects damage or the like to the lens assembly 12.

Figure 8:
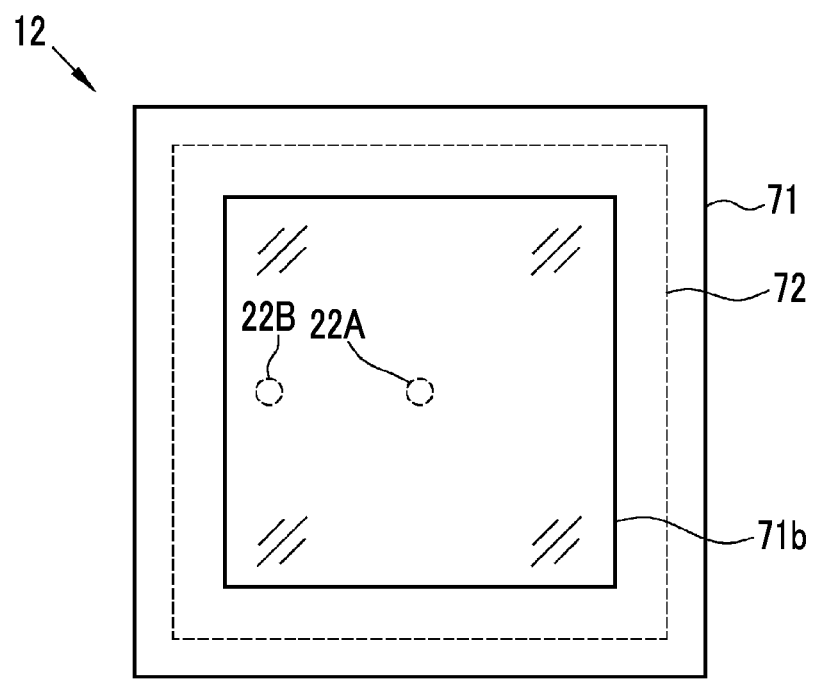
FIG. 8 is a diagram illustrating the lens assembly in a case where the lens assembly is provided with a spacer.

On the other hand, in a case where the spacer 93 is present, a distance between the flat surface 97 of the Fresnel lens 92 and the flat surface 99 of the second protective plate 94 is likely to be kept constant even though the Fresnel lens 92 and the second protective plate 94 are close to each other and are substantially integrally formed. As a result, even though the lens assembly 12 is used or stored under the same environment as the above-mentioned environment, the moire fringes 130 are not generated as shown in FIG. 8 or a frequency where the moire fringes 130 are generated can be significantly reduced. For this reason, accurate measurement and comparison can be performed for all the samples 22 including the samples 22A and 22B. Further, a user can smoothly use the fluorescence imaging device 10 without checking damage to the lens assembly 12, and the like.

Furthermore, since the Fresnel lens 92 is made of a resin, the Fresnel lens 92 may generate autofluorescence in a case where the excitation light 40 is applied to the Fresnel lens 92. The imaging unit 13 comprises the optical filter 53 for cutting the excitation light 40. However, since the imaging unit 13 cannot cut the autofluorescence generated by the Fresnel lens 92 in the case of a certain wavelength or the like of the autofluorescence generated by the Fresnel lens 92, the accurate measurement, comparison, and the like of the samples 22 may not be capable of being performed. However, the fluorescence imaging device 10 comprises the excitation light source 41 between the lens assembly 12 and the microplate 11, and the light emitting element 43 of the excitation light source 41 is always hidden from the imaging unit 13 by the light blocking member 44. For this reason, the excitation light 40 is not directly applied to the Fresnel lens 92 made of a resin. Accordingly, the generation of the autofluorescence of the Fresnel lens 92 made of a resin is prevented, so that the accurate measurement, comparison, and the like of the samples 22 can be performed.

The lens assembly 12 includes the spacer 93 between the flat surface 97 of the Fresnel lens 92 and the second protective plate 94 in the embodiment, but can also include the same spacer between the lens surface 96 and the first protective plate 91. However, since the lens surface 96 originally has irregularities, this is less likely to cause the moire fringes 130 in comparison with a case where the spacer 93 is not provided between the flat surface 97 of the Fresnel lens 92 and the second protective plate 94. For this reason, a spacer between the first protective plate 91 and the lens surface 96 can be omitted even in a case where the first protective plate 91 is provided on the lens surface 96 of the Fresnel lens 92 as in the embodiment.

In the embodiment, the lens assembly 12 includes the first protective plate 91 that protects the lens surface 96 of the Fresnel lens 92. However, the flat surface 97 directly facing the sample 22 is likely to deteriorate due to the acetic acid and the like of the sample 22, and the deterioration of the Fresnel lens 92 caused by the acetic acid and the like of the sample 22 can be suppressed in a case where at least the flat surface 97 is protected by the second protective plate 94. For this reason, the first protective plate 91 provided on the lens surface 96, which does not face the samples 22, may be omitted.

In the embodiment, the Fresnel lens 92 has been disposed so that the lens surface 96 faces the imaging unit 13. However, in a case where the specific shape of the lens surface 96 is changed, the Fresnel lens 92 can be disposed so that the lens surface 96 faces the samples 22. In this case, the spacer 93 is provided at least between the Fresnel lens 92 and the protective plate that faces the flat surface 97 of the Fresnel lens 92. For example, in a case where the arrangement of the first and second protective plates 91 and 94 is not changed in the embodiment and the Fresnel lens 92 is disposed so that the lens surface 96 of the Fresnel lens 92 faces the samples 22, the spacer 93 is provided at least between the Fresnel lens 92 and the first protective plate 91.

The fluorescence imaging device 10 has imaged the samples 22 using the fluorescence generated by the samples 22 in the embodiment, but the fluorescence imaging device 10 can image the samples 22 directly or indirectly illuminated and the image thereof can be used for an examination or the like. Further, the image can also be used for the measurement of the amount of transmitted light or the like. Of course, the fluorescence imaging device 10 can image samples even though the samples emit bioluminescence or chemiluminescence.

In the embodiment, the excitation light source 41 can irradiate one or a plurality of samples 22, which are held by the microplate 11 at any position being scanned, with the excitation light 40. Further, in the embodiment, the excitation light source 41 can also irradiate a sample 22A (see FIG. 9), which is present at a position hidden from the imaging unit 13 by the excitation light source 41, with the excitation light 40. However, even though the sample 22A, which is present at a position hidden from the imaging unit 13 by the excitation light source 41, is irradiated with the excitation light 40, the fluorescence emitted by the sample 22A cannot contribute to imaging. Furthermore, in a state where a fluorescent marker or the like emitting fluorescence is irradiated with high-power excitation light 40 and emits fluorescence, the fluorescent marker or the like may be discolored. That is, in a case where the fluorescent marker or the like is irradiated with the excitation light 40, it may be difficult for the fluorescent marker or the like to emit fluorescence due to a change in the structure of the fluorescent marker or the like. Accordingly, in a case where fluorescence does not contribute to imaging or the like, it is desirable to avoid irradiating the sample 22 with the excitation light 40 and to use so-called dark field illumination.

Figure 9:
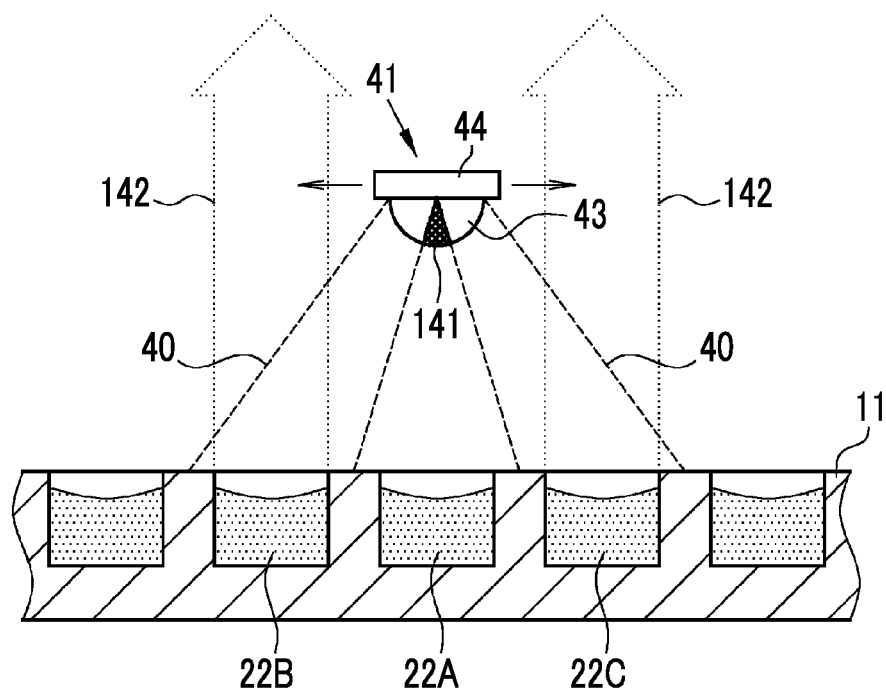
FIG. 9 is a diagram illustrating the specific configuration of the excitation light source.

For this reason, it is preferable that the excitation light source 41 is provided with a light blocking member 141 on a part of the light emitting element 43 and the excitation light 40 does not reach the sample 22A hidden from the imaging unit 13 by the excitation light source 41 as shown in, for example, FIG. 9. In this case, the discoloration of the sample 22A present at a position hidden by the excitation light source 41 can be prevented. In a case where the light blocking member 141 is provided, excitation light 40, which is emitted from portions of the light emitting element 43 where the light blocking member 141 is not present, reaches samples 22B and 22C and the like present at hidden positions. For this reason, the imaging unit 13 can image the samples 22B and 22C and the like using the fluorescence 142 emitted from the samples 22B and 22C and the like. Further, since the samples 22B and 22C and the like are obliquely irradiated with the excitation light 40, the efficiency of excitation is also high and excitation illumination without unevenness can be performed in comparison with a case where the samples 22B and 22C and the like are perpendicularly irradiated with the excitation light 40. Furthermore, there is also an advantage that imaging can be performed without the waste of the generated fluorescence 142.

Figure 10:
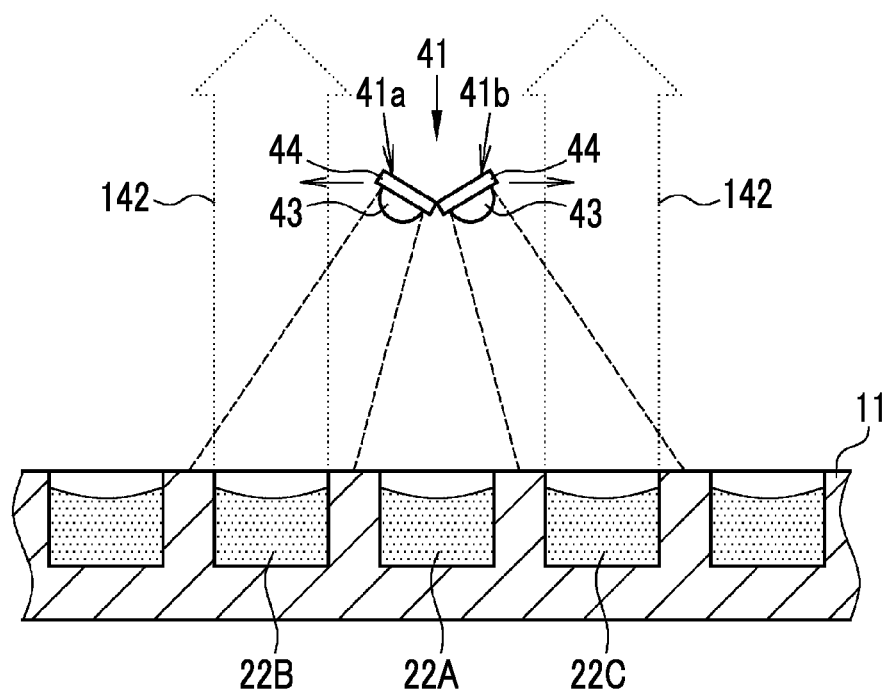
FIG. 10 is a diagram illustrating another configuration of the excitation light source.

Further, the excitation light source 41 can be formed using a plurality of excitation light sources instead of being provided with the light blocking member 141 as described above. For example, as shown in FIG. 10, an excitation light source 41 can be formed using a first excitation light source 41a and a second excitation light source 41b. The first and second excitation light sources 41a and 41b irradiate samples 22 other than the sample 22A, which is present at a position hidden by the excitation light source 41, with the excitation light 40. For example, the first excitation light source 41a irradiates a sample 22B, which is adjacent to the sample 22A hidden by the excitation light source 41, with the excitation light 40. Further, the second excitation light source 41b irradiates another sample 22C, which is adjacent to the sample 22A hidden by the excitation light source 41, with the excitation light 40. For this reason, the imaging unit 13 can image the samples 22B and 22C and the like using the fluorescence 142 emitted from the samples 22B and 22C and the like. On the other hand, since the first and second excitation light sources 41a and 41b do not irradiate the sample 22A, which is present at a position hidden by the excitation light source 41, with the excitation light 40, the discoloration of the sample 22A can be prevented. Further, since the samples 22B and 22C and the like are obliquely irradiated with the excitation light 40, the efficiency of excitation is also high and excitation illumination without unevenness can be performed in comparison with a case where the samples 22B and 22C and the like are perpendicularly irradiated with the excitation light 40. Furthermore, there is also an advantage that imaging can be performed without the waste of the generated fluorescence 142. In a case where the excitation light source 41 is formed using a plurality of excitation light sources, such as the first and second excitation light sources 41a and 41b, as described above and a case where the excitation light source 41 is formed using one or a plurality of excitation light sources and other elements, the excitation light source 41 scans the samples as a whole in the case of imaging and the respective excitation light sources and the like of the excitation light source 41 keep relative positions and directions during scanning. The same applies to the following modification examples and the like.

Figure 11:
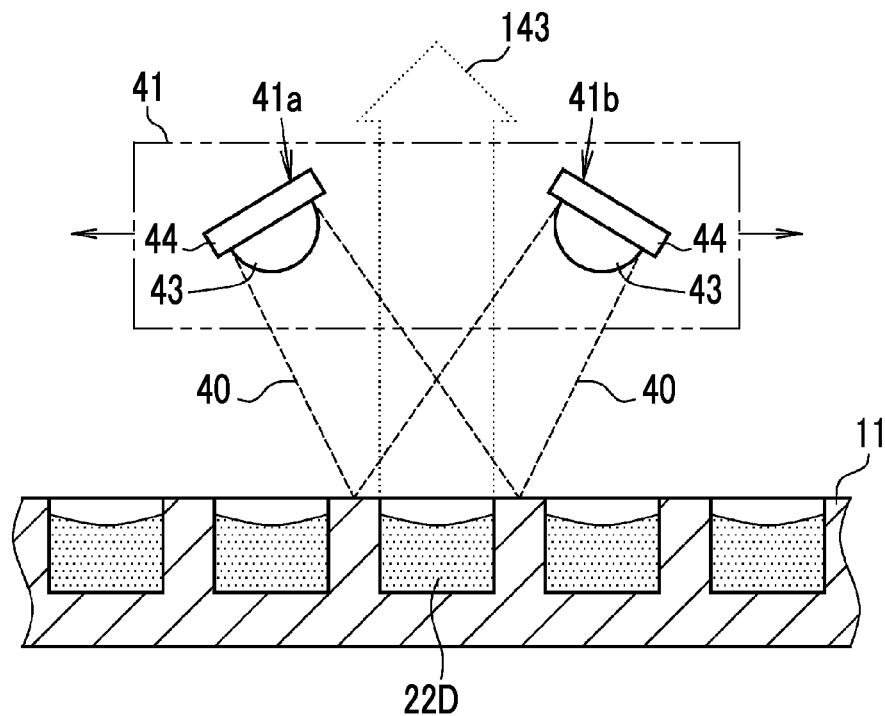
FIG. 11 is a diagram illustrating another configuration of the excitation light source.

In a case where the excitation light source 41 is formed using a plurality of excitation light sources as described above, the plurality of excitation light sources can irradiate one sample 22 with the excitation light 40. Specifically, as shown in FIG. 11, a first excitation light source 41a and a second excitation light source 41b are arranged with an interval corresponding to one sample 22 therebetween and the first and second excitation light sources 41a and 41b can be adapted to irradiate the same sample 22D with the excitation light 40. In this case, the imaging unit 13 can image the sample 22D using fluorescence 143 emitted from the sample 22D. In a case where the excitation light source 41 is formed using a plurality of excitation light sources and the plurality of excitation light sources irradiate the common sample 22D with the excitation light 40 as described above, the imaging unit 13 images one sample 22D (or a plurality of samples 22 present on the same row or column as that of the sample 22D) once. For this reason, since it is more difficult for the discoloration of the sample 22 to occur than those in modification examples shown in FIGS. 9 and 10, the configuration shown in FIG. 11 is particularly preferable. Further, the samples 22B and 22C and the like are obliquely irradiated with the excitation light 40. Accordingly, in comparison with a case where the samples 22B and 22C and the like are perpendicularly irradiated with the excitation light 40, the efficiency of excitation is also high, excitation illumination without unevenness can be performed, and imaging can be performed without the waste of the generated fluorescence 142. This is the same as the modification examples shown in FIGS. 9 and 10.

Figure 12:
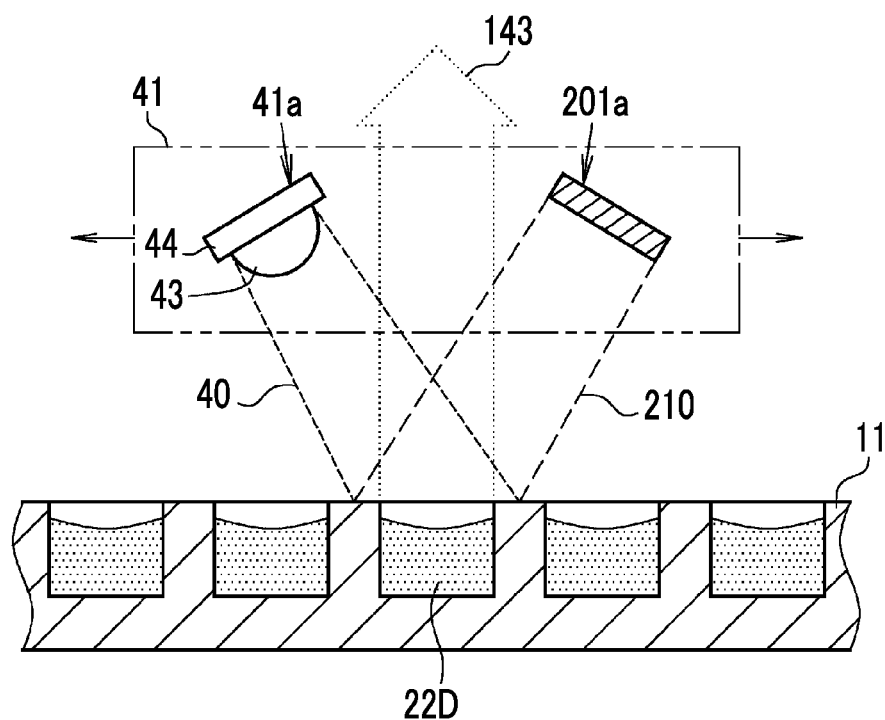
FIG. 12 is a diagram illustrating an example where the excitation light source includes a mirror.

The excitation light source 41 has been formed using two excitation light sources, that is, the first and second excitation light sources 41a and 41b in the modification example, but the excitation light source 41 can include elements other than the excitation light sources. For example, as shown in FIG. 12, an excitation light source 41 can be formed using a first excitation light source 41a and a mirror 201a. The mirror 201a further reflects reflected light, scattered light, or the like (hereinafter referred to as reflected light or the like) 210, which is generated by a sample 22D, the microplate 11, or the like, of excitation light 40 applied to the sample 22D by the first excitation light source 41a. Then, the mirror 201a irradiates the sample 22D again with a part or all of the reflected light or the like 210 of the excitation light 40.

In a case where a case where the excitation light source 41 is formed of the first excitation light source 41a and the mirror 201a as described above is compared with a case where the excitation light source 41 is formed using the first and second excitation light sources 41a and 41b, the power of the excitation light 40 is lower as the number of excitation light sources is smaller but the amount of effective excitation light 40 can be increased reusing the reflected light or the like 210 of the excitation light 40 generated by the sample 22D, the microplate 11, or the like. For this reason, in a case where the excitation light source 41 is formed of the first excitation light source 41a and the mirror 201a, the sample 22D can be excited with required power as in a case where the excitation light source 41 is formed using the first and second excitation light sources 41a and 41b. Further, in a case where the second excitation light source 41b and the mirror 201a are compared with each other, the mirror 201a is generally more inexpensive. For this reason, in a case where the excitation light source 41 is formed of the first excitation light source 41a and the mirror 201a as described above, the excitation light source 41 can be formed at low cost.

The specific shape and the like of the mirror 201a are random. That is, any of a plane mirror, a concave mirror, or a convex mirror can be employed as the mirror 201a. Further, the mirror 201a has been provided instead of the second excitation light source 41b in the modification example, but the mirror 201a may be provided instead of the first excitation light source 41a. In this case, excitation light 40 is applied from the second excitation light source 41b, and the reflected light or the like 210 of the excitation light 40 is reflected by the mirror 201a provided instead of the first excitation light source 41a and is reused for the excitation of the sample 22D.

Figure 13:
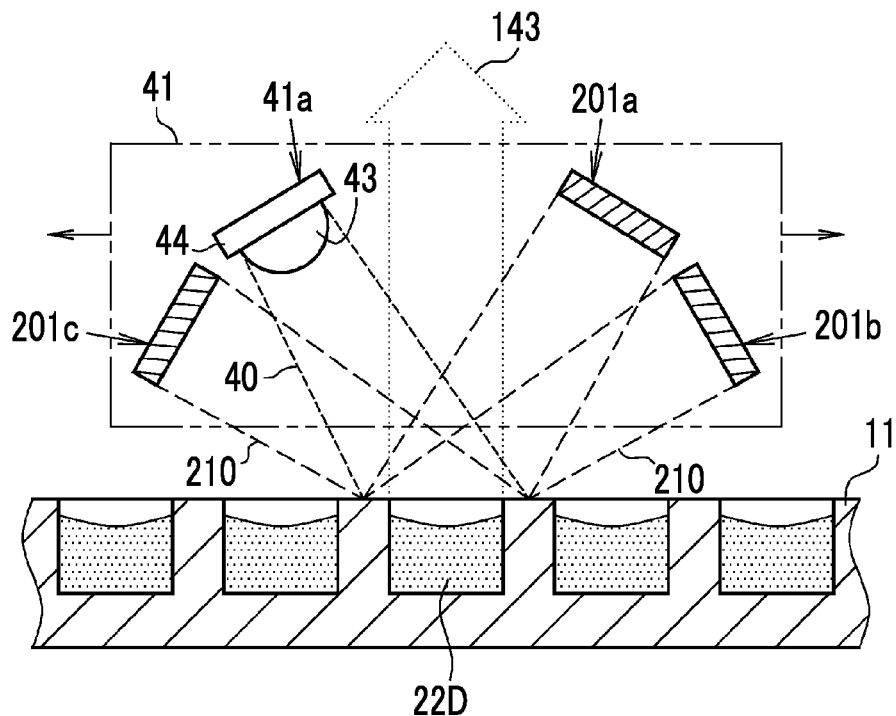
FIG. 13 is a diagram illustrating an example where the excitation light source includes a plurality of mirrors.
Figure 14:
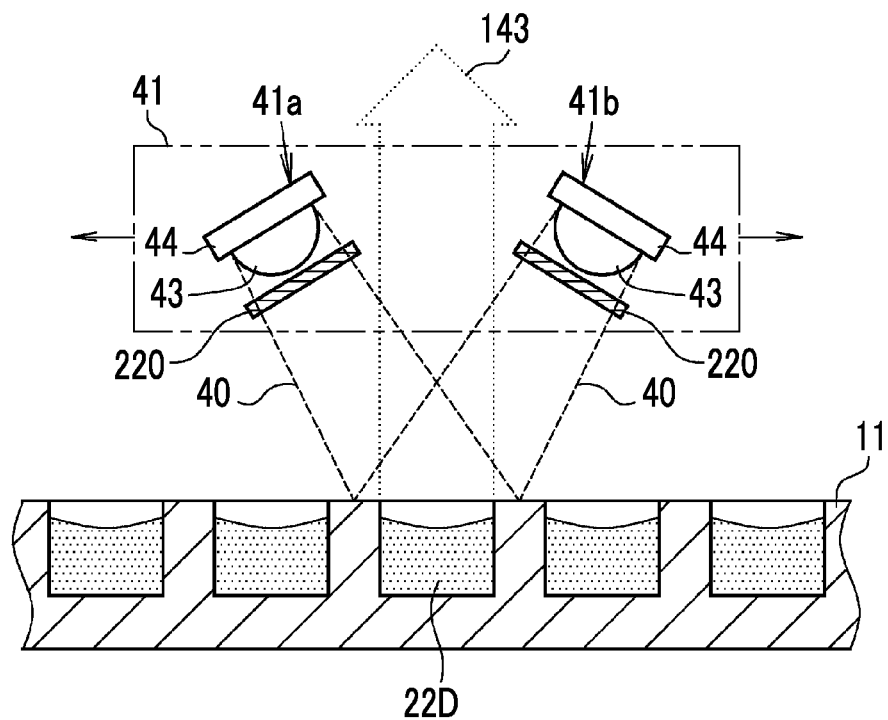
FIG. 14 is a diagram illustrating an example where the excitation light source includes an optical filter.

Further, one mirror 201a has been provided instead of the second excitation light source 41b in the modification example, but a plurality of mirrors reusing the reflected light of the excitation light 40 can be provided. For example, as shown in FIG. 13, an excitation light source 41 can be formed using a first excitation light source 41a and a mirror 201a, a mirror 201b, and a mirror 201c that reuse the reflected light or the like 210 of excitation light 40. In this case, the mirrors 201b and 201c are arranged at positions where the mirrors do not block the optical path of fluorescence 143 reaching the imaging unit 13.

The embodiment and various modification examples are adapted so that the excitation light 40 emitted from the excitation light source 41 reaches the sample 22 just as it is. However, the excitation light source 41 can comprise an optical filter that limits the wavelength of the excitation light 40. For example, in a case where an excitation light source 41 is formed of first and second excitation light sources 41a and 41b as shown in 14, each of the first and second excitation light sources 41a and 41b can be provided with an optical filter 220. The optical filters 220 transmit wavelength components, which particularly contribute to the excitation of the sample 22, of the excitation light 40 that is emitted from the first and second excitation light sources 41a and 41b. The optical filter 220 can be formed of, for example, colored glass, a multilayer-coated filter, a combination thereof, or the like. Since the monochromaticity of the excitation light 40 emitted from the excitation light source 41 can be improved in a case where the optical filters 220 are provided as described above, the fluorescence 143 can be efficiently generated from the sample 22. Further, since wavelength components not contributing to the excitation of the sample 22 (or wavelength components not improving the efficiency of excitation of the sample 22) can be reduced by the optical filter 220, it is possible to prevent these wavelength components from causing noise, such as stray light.

The optical filter 220 can be used not only in a case where the excitation light source 41 is formed of the first and second excitation light sources 41a and 41b as shown in FIGS. 10 and 11 but also in a case where the excitation light source 41 is formed of one excitation light source as shown in FIGS. 1 and 9. Further, even in a case where the excitation light source 41 includes the mirror 201a and the like as shown in FIGS. 12 and 13, the optical filter 220 can be used together.

In the embodiment, quantitative information can be more accurately obtained by so-called shading correction (also referred to as flat frame correction). A fluorescent plate is imaged instead of the microplate 11 and an image taken from the samples 22 of the microplate 11 is divided by an image taken from the fluorescent plate, so that the shading correction can be performed. For example, a fluorescent plate, which emits fluorescence having a wavelength close to the wavelength of fluorescence emitted from the samples 22, is used as the fluorescent plate used for the shading correction. Further, a fluorescent plate, which is slightly larger than the opening 82b, is used. A phosphorescent plate, which substantially uniformly emits light and is slightly larger than the opening 82b, is placed instead of the microplate and is imaged in the case of samples 22 that emit not fluorescence but bioluminescence or the like, so that shading correction can be performed in the same manner as described above. Further, in a case where the samples 22 are imaged using transmitted light or reflected light, the shading correction can be performed in the same manner as described above using a uniform milk-white plate (opal plate).

In the embodiment, the hardware structures of processing units, which perform various kinds of processing, such as the control unit 61, are various processors to be described later. Various processors include: a central processing unit (CPU) that is a general-purpose processor functioning as various processing units by executing software (program); a graphical processing unit (GPU); a programmable logic device (PLD) that is a processor of which the circuit configuration can be changed after manufacture, such as a field programmable gate array (FPGA); a dedicated electrical circuit that is a processor having circuit configuration designed exclusively to perform various kinds of processing; and the like.

One processing unit may be formed of one of these various processors, or may be formed of a combination of two or more same kind or different kinds of processors (for example, a combination of a plurality of FPGAs, a combination of a CPU and an FPGA, a combination of a CPU and a GPU, or the like). Further, a plurality of processing units may be formed of one processor. As an example where a plurality of processing units are formed of one processor, first, there is an aspect where one processor is formed of a combination of one or more CPUs and software as typified by a computer, such as a client or a server, and functions as a plurality of processing units. Second, there is an aspect where a processor implementing the functions of the entire system, which includes a plurality of processing units, by one integrated circuit (IC) chip is used as typified by System On Chip (SoC) or the like. In this way, various processing units are formed using one or more of the above-mentioned various processors as hardware structures.

In addition, the hardware structures of these various processors are more specifically electrical circuitry where circuit elements, such as semiconductor elements, are combined. Further, the hardware structure of a storage unit is a storage device, such as a hard disc drive (HDD) or a solid state drive (SSD).

EXPLANATION OF REFERENCES

10: fluorescence imaging device
11: microplate
12: lens assembly
13: imaging unit
15: housing
21: well
22, 22A, 22B, 22C, 22D: sample
26: sample guide
27: sample tray
31: lens portion
32: leg portion
40: excitation light
41: excitation light source
41a: first excitation light source
41b: second excitation light source
43: light emitting element
44: light blocking member
51: imaging element
52: lens
53: optical filter
61: control unit
62: display unit
71: frame
71a: upper surface portion
71b: window
72: lens unit
81: first frame
81b: opening
82: second frame
82b: opening
83: screw
86: gap
87: cushioning material
91: first protective plate
92: Fresnel lens
93: spacer
94: second protective plate
96: lens surface
97: flat surface
98: gap
99: surface
101: outer peripheral portion
102: notch
111: shaft
112A, 112B: microswitch
113: contact position
114A: first position
114B: scanning position
114C: second position
130: moire fringe
141: light blocking member
142, 143: fluorescence
201a, 201b, 201c: mirror
210: reflected light or the like
220: optical filter

What is claimed is:

1. A fluorescence imaging device comprising:
a microplate that holds a plurality of samples generating fluorescence;
a lens assembly that is disposed above the microplate, and includes a Fresnel lens of which at least a side facing the microplate is telecentric and which is made of a resin, a protective plate that protects a surface of the Fresnel lens facing the microplate, a spacer that forms a gap between the Fresnel lens and the protective plate, and a frame by which the Fresnel lens and the protective plate are sandwiched through the spacer; and
an imaging unit that collectively images the plurality of samples through the lens assembly using the fluorescence generated by the respective samples.

2. The fluorescence imaging device according to claim 1, wherein one surface of the Fresnel lens is a flat surface, and
the spacer forms the gap between the flat surface of the Fresnel lens and the protective plate.

3. The fluorescence imaging device according to claim 2, wherein the spacer is thinner than the Fresnel lens and the protective plate.

4. The fluorescence imaging device according to claim 2, wherein the spacer is in contact with the Fresnel lens and the protective plate at outer peripheral portions of the Fresnel lens and the protective plate.

5. The fluorescence imaging device according to claim 2, wherein the spacer comprises a notch connecting the gap, which is formed between the Fresnel lens and the protective plate, to an outside.

6. The fluorescence imaging device according to claim 2, wherein the frame holds the Fresnel lens and the protective plate while allowing the Fresnel lens and the protective plate to be movable in a plane direction.

7. The fluorescence imaging device according to claim 2, wherein the spacer is thinner than the Fresnel lens and the protective plate.

8. The fluorescence imaging device according to claim 7, wherein the spacer is in contact with the Fresnel lens and the protective plate at outer peripheral portions of the Fresnel lens and the protective plate.

9. The fluorescence imaging device according to claim 7, wherein the spacer comprises a notch connecting the gap, which is formed between the Fresnel lens and the protective plate, to an outside.

10. The fluorescence imaging device according to claim 7, wherein the frame holds the Fresnel lens and the protective plate while allowing the Fresnel lens and the protective plate to be movable in a plane direction.

11. The fluorescence imaging device according to claim 1, wherein the spacer is in contact with the Fresnel lens and the protective plate at outer peripheral portions of the Fresnel lens and the protective plate.

12. The fluorescence imaging device according to claim 11, wherein the spacer comprises a notch connecting the gap, which is formed between the Fresnel lens and the protective plate, to an outside.

13. The fluorescence imaging device according to claim 11, wherein the frame holds the Fresnel lens and the protective plate while allowing the Fresnel lens and the protective plate to be movable in a plane direction.

14. The fluorescence imaging device according to claim 1, wherein the spacer comprises a notch connecting the gap, which is formed between the Fresnel lens and the protective plate, to an outside.

15. The fluorescence imaging device according to claim 14, wherein the frame holds the Fresnel lens and the protective plate while allowing the Fresnel lens and the protective plate to be movable in a plane direction.

16. The fluorescence imaging device according to claim 1, wherein the frame holds the Fresnel lens and the protective plate while allowing the Fresnel lens and the protective plate to be movable in a plane direction.

17. The fluorescence imaging device according to claim 1, wherein the frame comprises a cushioning material provided at a portion thereof where the Fresnel lens, the spacer, and the protective plate overlap with each other.

18. The fluorescence imaging device according to claim 1, further comprising:
an excitation light source that is disposed between the lens assembly and the microplate and irradiates the samples with excitation light causing the fluorescence to be generated.

19. The fluorescence imaging device according to claim 18, wherein the excitation light source has a linear shape or a point shape, and irradiates the plurality of samples with the excitation light by scanning a range between the lens assembly and the microplate.

20. The fluorescence imaging device according to claim 19, wherein the excitation light source comprises a light blocking member on a surface thereof facing the lens assembly.

* * * * *